United States Patent [19]
Lingo et al.

[11] Patent Number: 5,449,268
[45] Date of Patent: Sep. 12, 1995

[54] VARIABLE SPEED DRIVE MECHANISM WITH DWELL

[75] Inventors: Kenneth E. Lingo, Shelby Township; Michael M. Manuszak, St. Clair; John H. Nolan, Harrison Township, all of Mich.

[73] Assignee: Western Atlas, Inc., Warren, Mich.

[21] Appl. No.: 222,126

[22] Filed: Apr. 4, 1994

[51] Int. Cl.⁶ .............................................. B66C 1/00
[52] U.S. Cl. ........................................ 414/729; 901/21; 198/468.6; 74/52; 74/490.04
[58] Field of Search ............... 414/729, 733; 901/21; 198/468.6; 74/52, 479 BF, 490.04

[56] References Cited
U.S. PATENT DOCUMENTS

| | | |
|---|---|---|
| 1,786,608 | 12/1930 | Halstead ................................ 414/733 |
| 4,530,637 | 7/1985 | Mason et al. .................... 414/733 X |
| 5,271,757 | 12/1993 | Houben et al. ................. 414/733 X |

*Primary Examiner*—Donald W. Underwood
*Attorney, Agent, or Firm*—Barnes, Kisselle, Raisch, Choate, Whittemore & Hulbert

[57] ABSTRACT

A variable speed drive mechanism for transferring a workpiece in an accelerated and decelerated motion comprising a pair of spaced carrier arms driven by a main shaft that rotates through a fixed stationary gear. A set of pulleys is mounted between the carrier arms and a flexible drive member drivingly connects the stationary gear and the pulleys. One of the set of pulleys drives a pair of bellcranks each of which is operatively connected to a transfer arm through a roller and cam slot arrangement. The connection between the bellcrank and the transfer arm provides a more desirable acceleration and deceleration movement of the transfer arms.

8 Claims, 7 Drawing Sheets

VARIABLE SPEED DRIVE MECHANISM WITH DWELL

FIELD OF THE INVENTION

This invention is related to a workpiece transfer system and more particularly to a variable speed workpiece transfer mechanism.

BACKGROUND OF THE INVENTION

Various motion devices have been provided utilizing complicated cams and followers or a system of links to provide an accelerating and decelerating motion for transferring workpieces. Many of these motion devices are used for reciprocating a member, such as a multiple indexing table along a straight path and provide a smooth starting and stopping motion to reduce shock.

Many applications arise in which it is required to transfer workpieces from one location to another. For example, one method of transferring workpieces is known as free part transfer. In this method, a workpiece, such as a cam shaft, is independently transferred from one location to another. This method utilizes a transfer device that clamps a workpiece at a first location, lifts and carries the workpiece to another location, and then releases the workpiece. Another method of transfer may use a rotary or reciprocating index table. It is often desirable to move the workpiece through an accelerating and decelerating motion in which the workpiece is first slowly accelerated to a peak velocity, decelerated, and deposited in another location.

While various drive mechanisms have been used for these applications, it is still desirable to provide a drive mechanism which has a faster cycle time but which more gently moves through its accelerated and decelerated motion.

SUMMARY OF THE INVENTION

A variable speed work transfer mechanism which provides a rapid workpiece transfer cycle while gently lifting and lowering the workpiece. The mechanism has at least one workpiece transfer arm which moves the workpiece in an arcuate path with an accelerating and decelerating motion. The workpiece arm is driven through a slide and a bellcrank mechanism which is carried by an arm rotated by a prime mover, such as an electric motor. As the carrier arm is moved along its arcuate path, the bellcrank mechanism is rotated by an endless flexible member received on idler pulleys carried by the arm and engaging a stationary gear preferably coincident with the axis about which the carrier arm rotates.

Thus, as the prime mover drives the bellcrank carrier arm in an arcuate path, the endless flexible member rotates the bellcrank to impart an accelerating and decelerating motion to the workpiece carrier arm to gently lift the workpiece from a first location, rapidly accelerate it, decelerate it and gently deposit the workpiece in a second location.

The transfer mechanism may also be utilized to drive either a rotary or straight reciprocating index table to move a workpiece from one location to another.

Objects, features and advantages of this invention are to provide a workpiece transfer mechanism which has a faster transfer cycle time, very gently and smoothly lifts, transfers and deposits the workpiece, rotates the workpiece so that it is deposited in its original angular orientation, and is relatively simple, stable, rugged, durable, reliable, of economical manufacture and assembly, has a long in service useful life and requires relatively little maintenance and repair.

BRIEF DESCRIPTION OF THE DRAWINGS

These and other objects, features, and advantages of this invention will be apparent from the following detailed description of the preferred embodiment and best mode, appended claims and accompanying drawings in which:

DETAILED DESCRIPTION

Figures 1, 8:
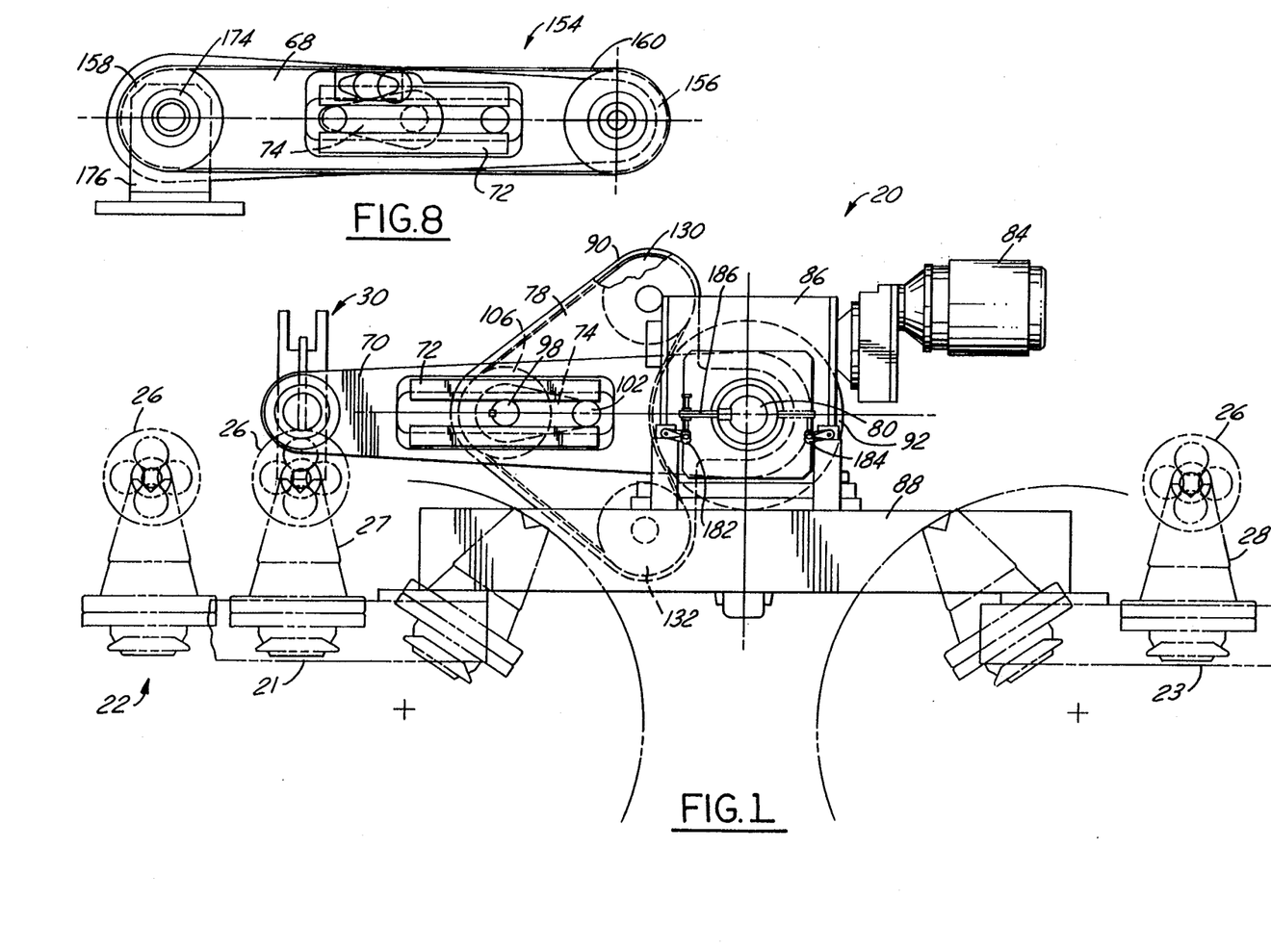
FIG. 1 is a side view of the workpiece transfer mechanism of the present invention.
FIG. 8 is a sectional view taken along line 8—8 of FIG. 5.

Referring to FIG. 1, a workpiece transfer mechanism 20 embodying the invention is located centrally between the downstream end of a conveyor 22 and the upstream end of a conveyor 24 to transfer a workpiece such as a crankshaft 26. The mechanism 20 engages a crankshaft resting in a holder 27 at a first position 21, to lift, carry, and deposit it in a holder 28 on conveyor 24 at a second position 23. Due to the unique configuration of the crankshaft 26, it is necessary to place it at position 23 in the same angular orientation as it was in at position 21 so that it will be properly oriented in the holder 28 for downstream operations.

Figure 2:
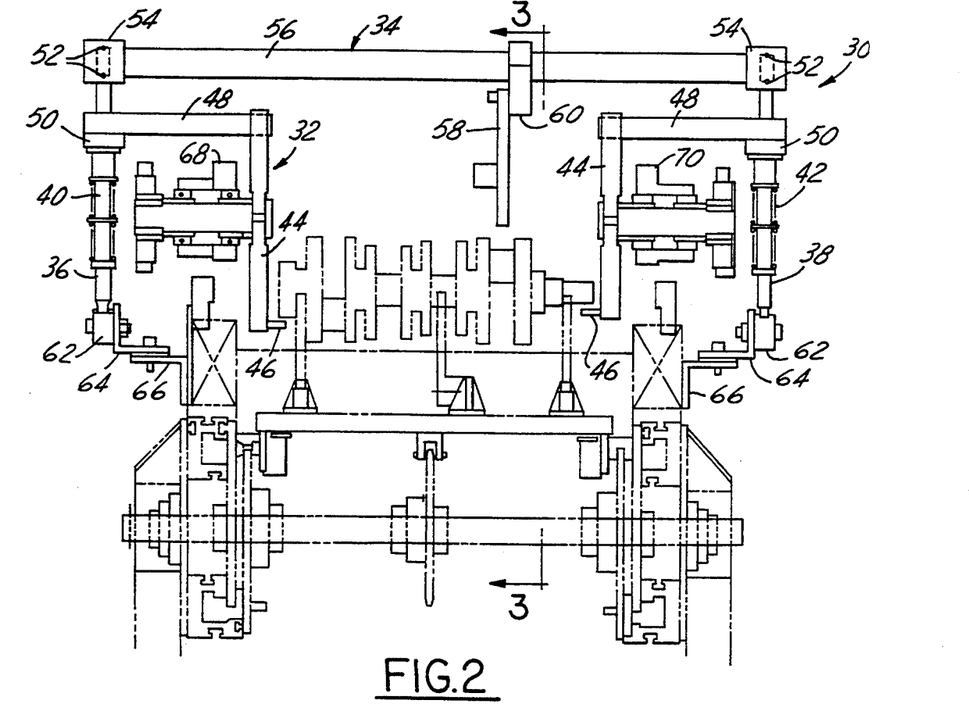
FIG. 2 is a front view of the workpiece transfer system of the present invention.
Figure 3:
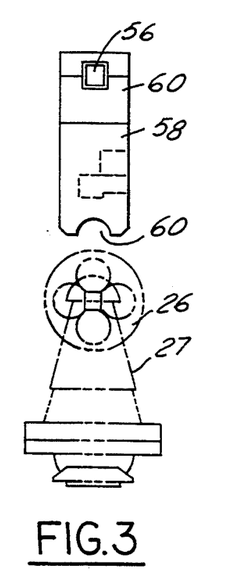
FIG. 3 is a partial enlarged view taken along line 3—3 of FIG. 2.
Figure 4:
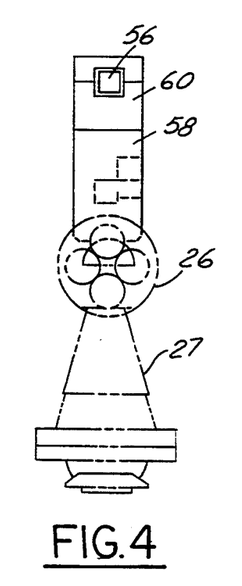
FIG. 4 is a view similar to FIG. 3 showing the workpiece gripping mechanism engaging the workpiece.

A workpiece engaging mechanism 30 (FIG. 2) is located at the free ends of the transfer mechanism 20 to lift the workpiece from the holder 27 and hold it as the transfer mechanism carries the workpiece from conveyor 22 to conveyor 24. The workpiece engaging mechanism 30 has a lift assembly 32 and a stabilizer assembly 34 connected by rods 36,38 and biased toward each other by springs 40,42 acting between the assemblies 32,34. The lift assembly 32 has members 44 each having a pair of workpiece engaging pins 46 located at one end and spaced equidistant from the center of the workpiece. The pins 46 are positioned below and disengaged from the workpiece when it is located in the holder 27. The other end of each member 44 is secured to an arm 48 having a collar 50 that slidably receives the rods 40,42. The rods 40,42 are connected at one end to the stabilizer assembly 34 by screws 52 in a collar 54 at each end of a bar 56 which has a workpiece stabilizer 58 mounted thereto by a bracket 60. The stabilizer 58 has a slot 61 (FIGS. 3 and 4) having a configuration complementary to a portion of the workpiece. The lower end of the rods 40,42 engages a cam 62 secured by brackets 64,66 to each conveyor 22 and 24.

In operation, the conveyors 22,24 are timed with the transfer mechanism 20 so that a workpiece is advanced to and dwells in position 21 while it is clamped and lifted by the transfer mechanism. The workpiece 26 is lifted through an arcuate path, deposited in an empty holder 28 that has been indexed to position 23 and released. The mechanism 20 then returns to engage a new workpile that has been indexed to position 21 by conveyor 22 and conveyor 24 advances the deposited workpiece and moves another empty holder 28 into position 23. The steps are then repeated to transfer another workpiece from conveyor 22 to conveyor 24.

In the mechanism 20 a workpiece is supported and moved by a pair of transfer arms 68 and 70 driven through a slide 72 and bellcrank 74 which is journalled on a pair of carrier arms 76 and 78. The carrier arms are fixed to a main shaft 80 driven on its axis 82 by a reversible electric motor 84 through a gear reducer 86 mounted on a base 88. As the carrier arms rotate, the bellcrank 74 is rotated by a flexible drive belt 90 in cooperation with a stationary gear 92 about which the carrier arms rotate.

The main shaft 80 is journalled for rotation by a bearing 94 mounted in a bracket 96 fixed to the base 88. The carrier arms 76,78 are fixed to the main shaft 80 for rotation therewith.

The bellcrank 74 is driven by a shaft 98 journalled for rotation by bearing assemblies 100 on the carrier arms and has a roller follower 102 received in an associated guide track 104 in the slide 72 fixed to one of the transfer arms 68 and 70. The shaft 98 is rotatably driven through a timing drive pulley 106 keyed to the shaft.

Figure 7:
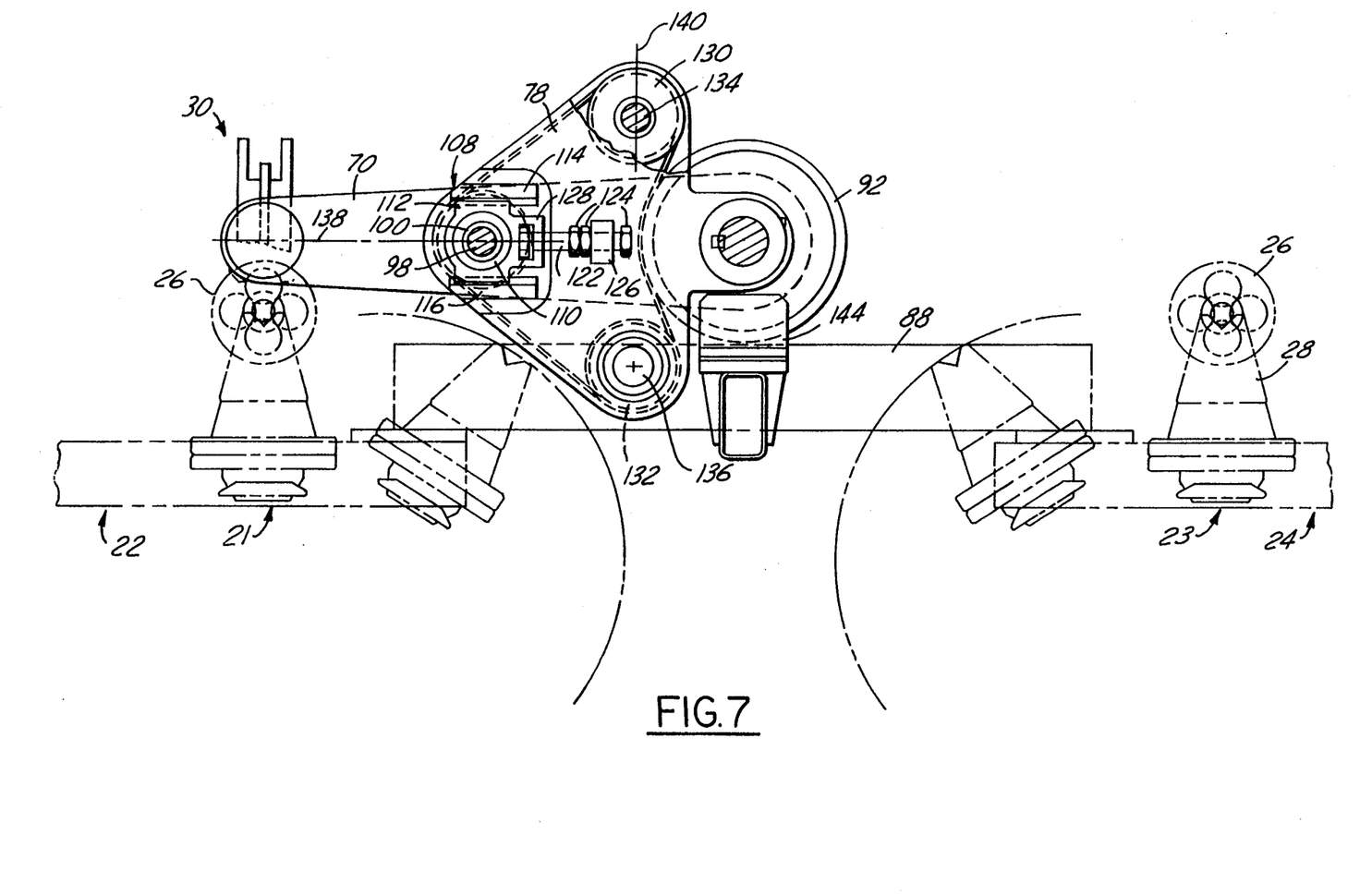
FIG. 7 is a sectional view taken along line 7—7 of FIG. 5.

The shaft 98 is journalled in a take-up mechanism 108 (FIG. 7) by bearings 110 mounted on slide blocks 112 carried by rails 114 and 116 fixed to the arms 76 and 78 for tensioning the belt 90 and adjusting the drive mechanism by changing the distance between the rotational axes 82 and 120 of the main shaft 80 and the bellcrank 74, respectively. The position of each slide block 112 is adjusted by a bolt 122 with jamb nuts 124 thereon threaded through a mounting tab 126 fixed to one of the carrier arms and abutting a tab 128 fixed to the slide block.

Figure 5:
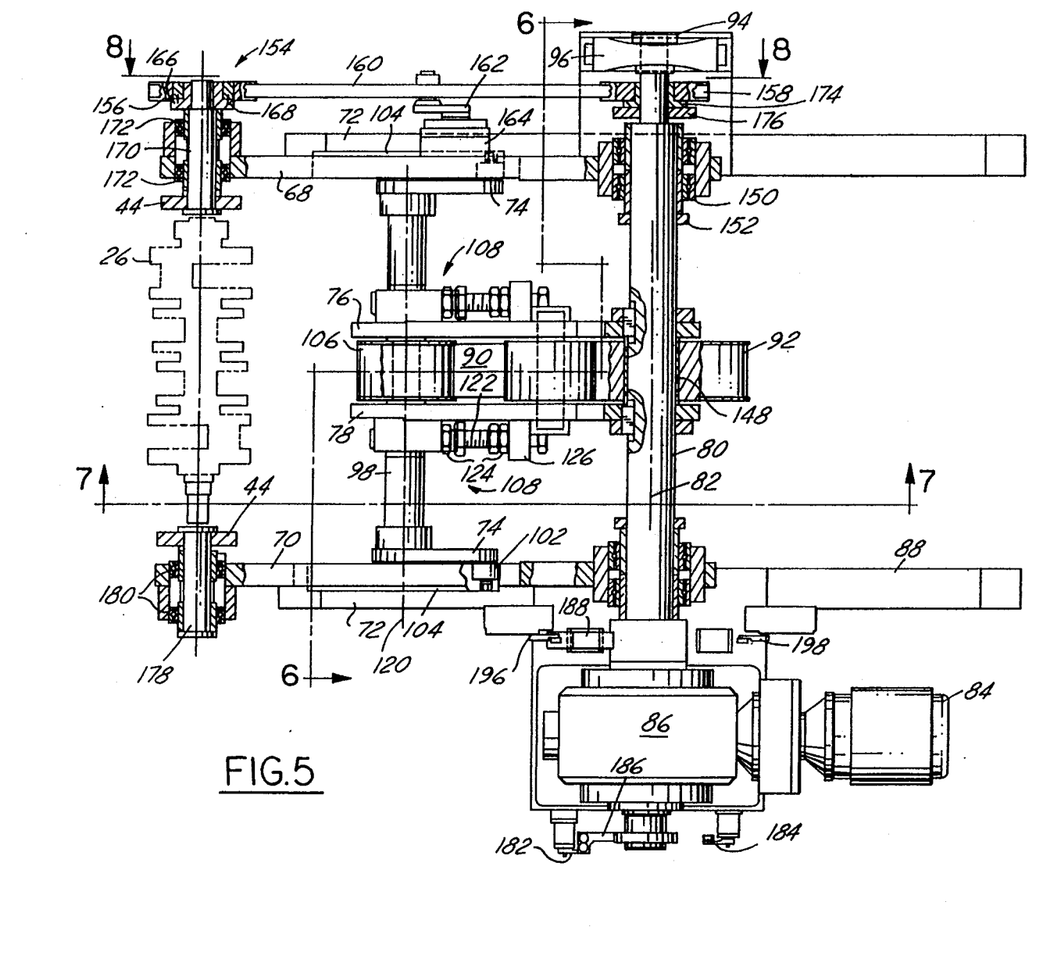
FIG. 5 is a top view of the transfer mechanism.
Figure 6:
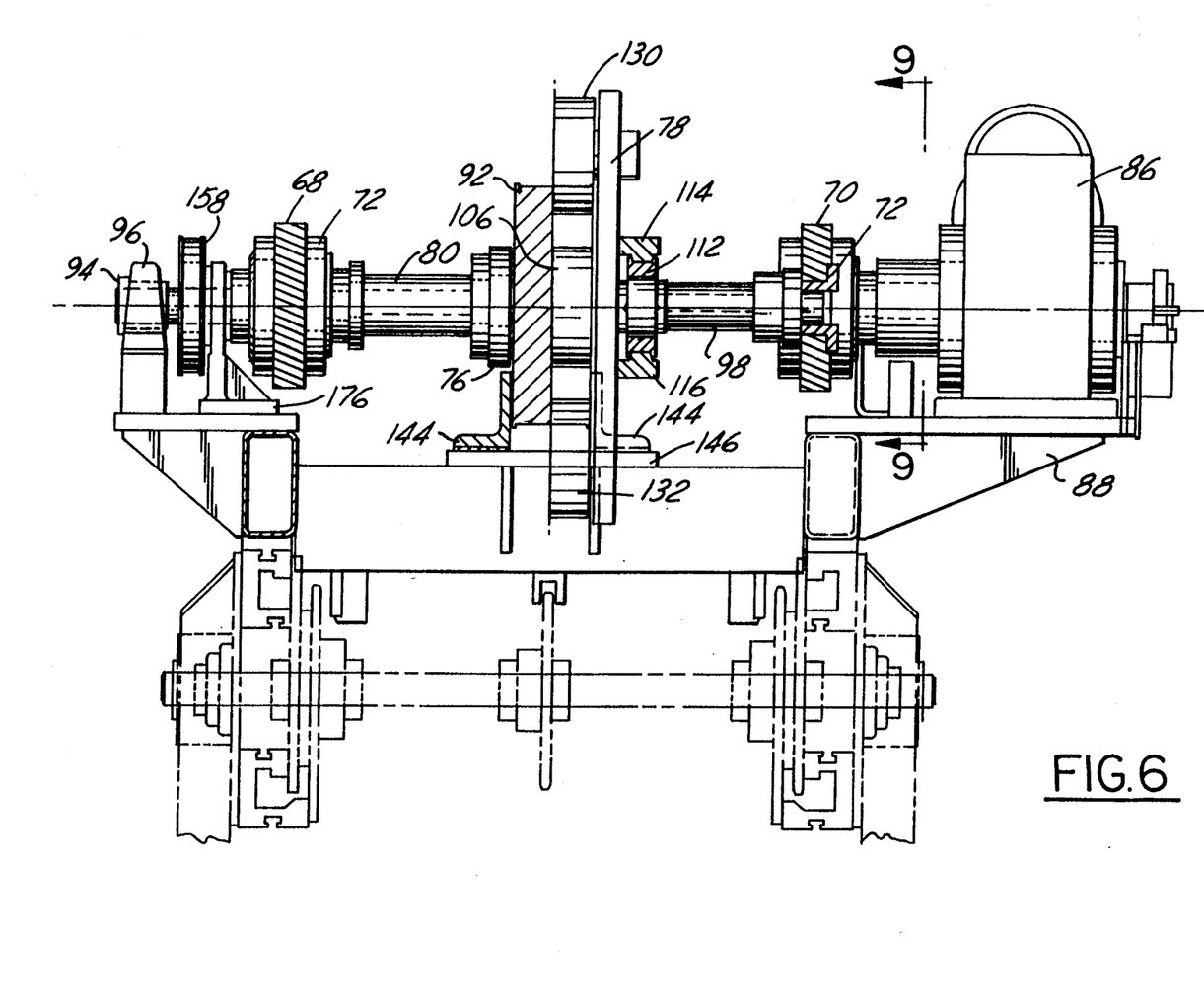
FIG. 6 is a sectional view taken along line 6—6 of FIG. 5.

The bellcrank 74 is rotated by the belt 90 which is received on both the drive pulley 106 and a pair of idler pulleys 130 and 132 carried by the arms 76 and 78 and engaged with the stationary gear 92. Each idler pulley 130 and 132 is rotatably mounted on a shaft 134 and 136, respectively, and secured to the carrier arms 76 and 78 equidistant from and on opposite sides of the longitudinal axis 138 of the carrier arms and along an axis 140 perpendicular to both axis 138 and the axis 82 of the main shaft 88. The drive pulley 106 is mounted about an axis 120 which intersects the axis 138. The belt 90 has teeth on both sides thereof so that it will engage without slipping both the drive pulley 106 and the stationary gear 92. The stationary gear is fixed to the base by anchor bracket 144 and a spacer 146 and is preferably mounted concentrically with the axis 82 of the main shaft 80 and of the carrier arms 76 and 78. The main shaft 80 is also mounted within a bearing 148 (FIG. 5) carried by the stationary gear 92 for rotation relative to the stationary gear.

The pair of spaced workpiece transfer arms 68 and 70 are located at each side of the transfer mechanism and rotatably journalled on the main shaft 80 through bearings 150 mounted on hubs 152 at one end. The transfer arms are mounted concentrically with the axis 82 of the main shaft 80 and rotate relative thereto.

A workpiece angular orientation mechanism 154 (FIG. 5 & 8), at one end of the transfer mechanism, angularly orients the workpiece for placement in the holder 28 at position 23. It has first and second toothed or timing pulleys 156 and 158 drivingly connected through a toothed timing belt 160. The teeth of the belt 160 engage the teeth of the pulleys 156 and 158 to prevent slippage therebetween. A belt tensioner 162 is mounted to transfer arm 68 by a bracket 164 to ensure proper driving engagement with the pulleys 156 and 158.

The pulley 156 is secured by screws 166 to a hub 168 secured in driving engagement to a shaft 170 secured to member 44 and rotatably mounted to the transfer arm 68 by a bearing 172. The pulley 158 is stationary and is fixed to a hub 174 mounted on a bracket 176 on the base. On the opposite end of transfer arm 70 a shaft 178 is mounted for free rotation in member 44 by a bearing 180. In the preferred embodiment, the pulleys 156 and 158 are of the same diameter so that as the transfer arms rotate through about 180° in a clockwise direction, the pulley 156 is rotated counterclockwise 180° to maintain the proper orientation or angular position of the workpiece from the position of FIG. 1 to the position of FIG. 12. However, it is understood that if the transfer arms move through more or less than 180°, the ratio of the pulleys must be changed accordingly to achieve a 180° rotational movement of the workpiece.

Figure 9:
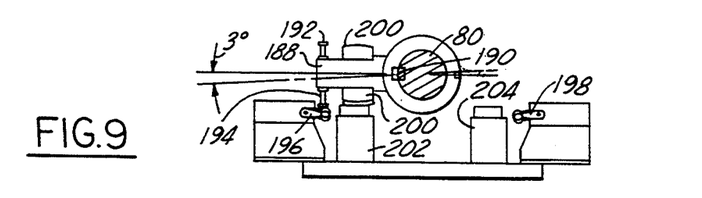
FIG. 9 is a fragmentary sectional view taken along line 9—9 of FIG. 6.
Figure 10:
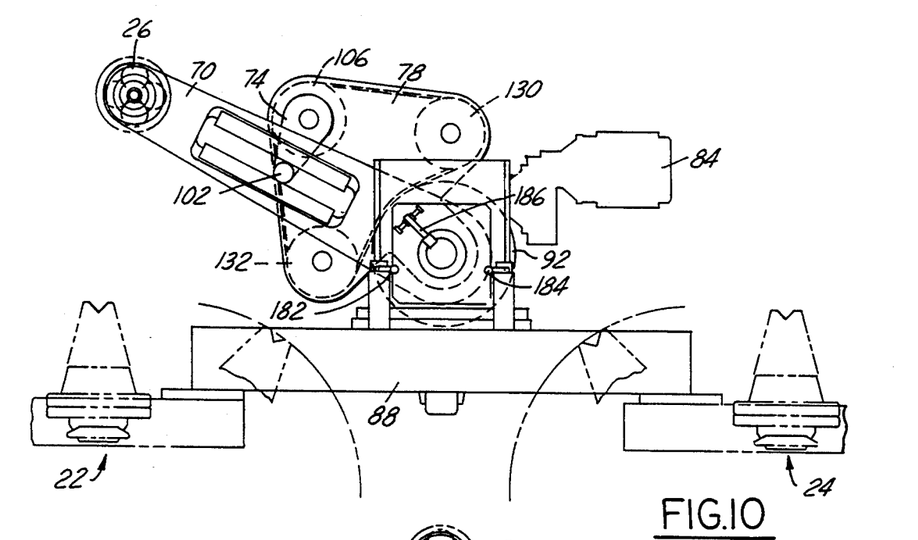
FIGS. 10-12 are side views similar to FIG. 1 showing various positions of the drive mechanism.

Limit switches 182 and 184 (FIG. 5) are provided to stop and reverse rotation of the motor and are engaged by an actuator arm 186 connected to the main shaft for rotation therewith. An overtravel stop arm 188 (FIG. 9) is rotatably keyed at 190 to the main shaft for rotation therewith. The stop has a pair of opposed screws 192 and 194 to engage limit switches 196 and 198, respectively, to stop the motor in case of failure of switches 182 and 184. The main shaft is permitted approximately 3° of maximum overtravel before lugs 200 on the arm engage blocks 202 and 204 to physically positively limit rotation.

Figure 12:
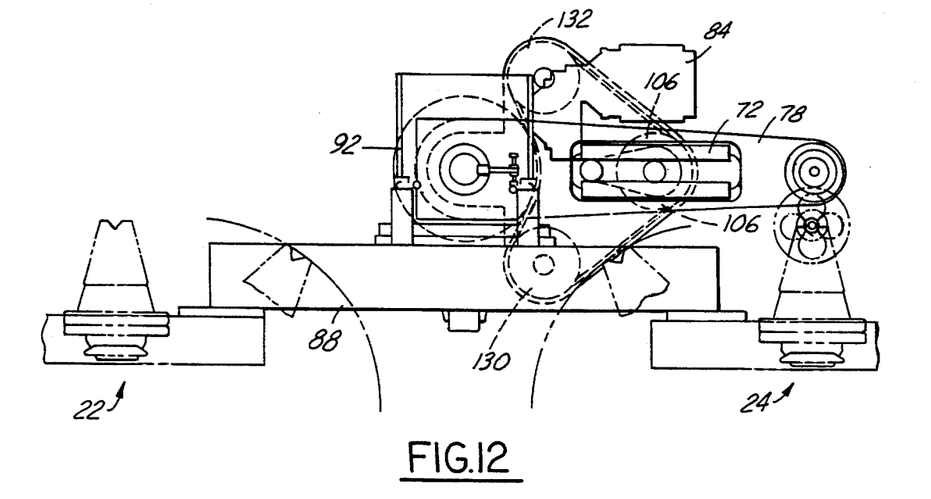

In use, when the main shaft is driven by the motor 84 through the gear reducer 86 through an angle typically of about 180°, the transfer arms 68, 70 are carried with it from the position shown in FIG. 1 to the final position shown in FIG. 12. Initially, the transfer arms are moved slowly relative to the carrier arms 76, 78 and then are rapidly accelerated to a maximum velocity and then decelerated as the carrier arms are driven at a constant velocity by the main shaft. This is accomplished by the bellcranks and slides connected to the transfer arms.

The entire work engaging mechanism 30 rotates with the transfer arms. Initial movement of the transfer arms raises the members 44 to cradle the workpiece between the pins 46 to lift it from its holder. As the transfer arms move further, the rods 36,38 disengage from the cams 62 allowing the springs 40,42 to bias the lift assembly 32 toward the stabilizer assembly 34 so that a portion of the workpiece is nested within the slot 60 of the plate 58 and is securely held between the assemblies 32,34.

During initial movement of the carrier arms 76 and 78, the movement of the transfer arms 68 and 70 about the axis 82 is retarded. This is due to the effect of the roller 102 moving within the guide track 104. As the carrier arms 76 and 78 and drive pulley 106 rotate in a clockwise direction, the roller 102 moves in the guide track 104 to retard motion of the transfer arms 68 and 70.

Figure 11:
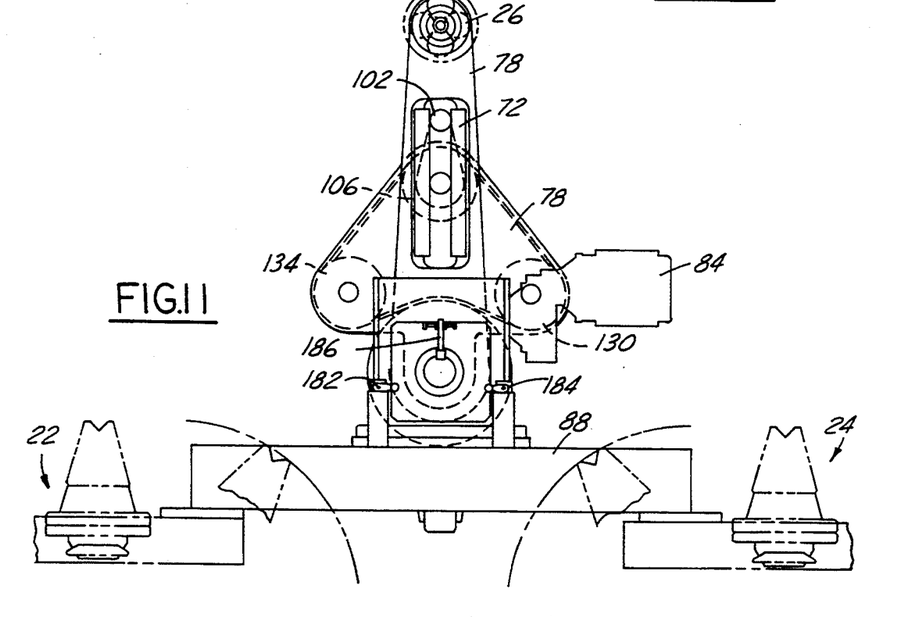

This slow movement of the transfer arms continues through the first 90° of rotation of the bellcrank 74. As the bellcrank continues to rotate through the next 90°, its clockwise movement is additional to the clockwise movement of the carrier arms, therefore accelerating the speed of the transfer arms to a maximum at the position shown in FIG. 11. As the main shaft continues to rotate at its constant speed, the bell crank is driven through another 90° of movement which acts to decelerate the speed of the transfer arms by the sliding movement of the follower member in the slide. The final 90° of rotation of the bellcrank also retards the motion of the transfer arms due to the movement of the roller in the slot to gently place the workpiece at its final position.

As the workpiece is placed within the holder 28, rods 36,38 engage cams 62 on conveyor 24 to force the stabilizer assembly 34 away from the lift assembly 32 to release the workpiece from the plate 58. The workpiece which is now cradled between the pins 46 is gently lowered into the holder 28.

It is desirable that the parameters of the drive mechanism be selected so that the desired accelerated and decelerated motion of the transfer arms and the proper orientation of the workpiece is achieved. While the drawings show the transfer arms 68 and 70 as moving through an arc of about 180° from position 21 to position 23, it will be understood in a particular application, they may move more or less than 180° to transfer workpiece from one position to another.

If the transfer arms are moved through an arc of 180°, in order to achieve the proper acceleration and deceleration, the drive pulley 106 must have an effective diameter which is one-half the diameter of the stationary gear 92. If the transfer arms are to move through a movement of more or less than 180° the diameter of the pulley 106 must be changed accordingly.

In order to achieve a dwell at positions that are 180° apart, it is necessary that the follower member 102 rotate about its axis through an arc having a radius 206 that is one-third of the radius 208 of the arc through which the drive pulley 106 moves about the main shaft 80. However, if it is desired to achieve a dwell at positions more or less than 180°, the ratio of radius 206 the radius 208 must be changed accordingly.

It is to be understood that the transfer mechanism may be utilized to drive devices other than the work engaging mechanism 30. For example, in another embodiment (not shown), the transfer mechanism may drive either a rotary or straight reciprocating index table to transfer workpieces from one location to another. In this embodiment, the mechanism 20 is positioned, for example, 90° from the position shown in FIG. 1, i.e., on its side. One of the transfer arms 70 is connected to an index table to drive the index table through an accelerated and decelerated movement.

What is claimed is:

1. A transfer mechanism comprising:
   a frame,
   a drive carried by said frame,
   a first shaft carried by said frame and journalled for rotation by said drive,
   a stationary gear carried by said frame,
   at least one carrier arm connected to said first shaft for rotation therewith,
   a second shaft journalled for rotation and carried by said carrier arm in spaced apart relation to said first shaft,
   an endless flexible drive member operably connected with said second shaft, carried by said carrier arm and engaged with said stationary gear, for rotating said second shaft in response to rotation of said carrier arm,
   at least one bellcrank having two ends, said second shafts being connected with said bellcrank adjacent one of said ends for rotation therewith,
   a follower carried by said bellcrank adjacent the other of said ends of said bellcrank,
   at least one elongate transfer arm having two ends, said transfer arm journalled adjacent one of said ends for rotation about said first shaft,
   a slide carried by said transfer arm and engaged with said follower, and
   a workpiece gripper carried by said transfer arm adjacent the other of said ends thereof, and
   said second shaft is rotatable on a first axis which rotates about a second axis along an arc having a first radius, said follower rotates about said first axis along an arc having a second radius, such that as said first shaft rotates at a constant speed, said transfer arm is driven at a varying speed beginning from substantially zero, accelerating to a maximum speed and decelerating to a substantially zero speed.

2. The mechanism of claim 1 wherein said first axis is located at a point along the longitudinal axis of said carrier arm.

3. The mechanism of claim 1 which comprises
   a pair of carrier arms,
   a first pulley rotatably mounted between said carrier arms on said first axis,
   a second pulley rotatably mounted between said carrier arms on a third axis,
   a third pulley rotatably mounted between said carrier arms on a fourth axis, wherein said third and fourth axes are aligned along an axis perpendicular to the longitudinal axis of said carrier arms.

4. The mechanism of claim 3 wherein
   said stationary gear is fixed concentric with said second axis,
   said flexible drive member having one side in driving engagement with and forming a continuous loop about the outer periphery of each said first, second, and third pulleys on one side and having an opposite side in driving engagement with the periphery of said stationary gear so that as said first shaft rotates said carrier arms about said second axis, said flexible drive member moves about the outer periphery of said stationary gear to drive said first pulley about said first axis.

5. The mechanism of claim 4 wherein
   said follower rotates about said first axis as said carrier arms rotate about said second axis.

6. The mechanism of claim 5 wherein
   said follower travels within said slide along the longitudinal axis of said transfer arm as it rotates about said first axis as said carrier arms rotate about said second axis.

7. The mechanism of claim 6 wherein
   said first radius is three times greater than said second radius.

8. The mechanism of claim 6 wherein
   said first, second, and third pulleys have a diameter that is one-half the diameter of said stationary gear.

* * * * *